(12) United States Patent
Rueger et al.

(10) Patent No.: US 6,826,504 B2
(45) Date of Patent: Nov. 30, 2004

(54) METHOD AND APPARATUS FOR CONTROLLING SYSTEM PARAMETERS

(75) Inventors: Johannes-Jörg Rueger, Vaihingen/enz (DE); Matthias Mrosik, Stuttgart (DE); Volker Pitzal, Waldstetten/Wissgoldingen (DE); Udo Schulz, Vaihingen/enz (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 09/824,080

(22) Filed: Apr. 2, 2001

(65) Prior Publication Data

US 2001/0032058 A1 Oct. 18, 2001

(30) Foreign Application Priority Data

Apr. 1, 2000 (EP) .............................................. 00107000

(51) Int. Cl.⁷ .............................................. G01R 35/00
(52) U.S. Cl. ..................................................... 702/107
(58) Field of Search ............................. 702/57, 64, 65, 702/107, 108, 117, 189; 123/490, 497, 498; 310/316.01, 316.03

(56) References Cited

U.S. PATENT DOCUMENTS

| 4,841,936 | A | 6/1989 | Takahashi | 123/447 |
|---|---|---|---|---|
| 5,714,831 | A | 2/1998 | Walker et al. | 310/316.01 |
| 6,157,174 | A | 12/2000 | Hoffmann et al. | 320/166 |
| 6,236,190 | B1 | 5/2001 | Hoffmann et al. | 320/166 |
| 6,539,925 | B2 * | 4/2003 | Rueger et al. | 123/490 |
| 2001/0027780 | A1 * | 10/2001 | Rueger et al. | 123/498 |
| 2002/0023622 | A1 * | 2/2002 | Rueger et al. | 123/490 |

FOREIGN PATENT DOCUMENTS

| DE | 196 52 807 | 6/1998 |
|---|---|---|
| DE | 197 29 844 | 1/1999 |
| DE | 197 42 073 | 3/1999 |
| WO | WO 98/19346 | 5/1998 |
| WO | WO 98/27601 | 6/1998 |

* cited by examiner

Primary Examiner—Michael Nghiem
(74) Attorney, Agent, or Firm—Kenyon & Kenyon (57) ABSTRACT

A method and an apparatus for controlling system parameters, in particular for controlling the voltage applied to piezoelectric elements (10, 20, 30, 40, 50, 60) within a circuit (A) for charging and discharging piezoelectric elements (10, 20, 30, 40, 50, 60) are described. The method is characterized by modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter. The apparatus is particularly eligible for use with the inventive method.

8 Claims, 7 Drawing Sheets

METHOD AND APPARATUS FOR CONTROLLING SYSTEM PARAMETERS

The present invention concerns a method and an apparatus for controlling system parameters, in particular for controlling the voltage applied to piezoelectric elements within a circuit for charging and discharging piezoelectric elements.

Control systems generally comprise a control unit typically but not necessarily comprising a central processing unit (CPU), at least one controlled element and utilization means which transform CPU signals if and as necessary and apply them to the controlled element. For this purpose, the CPU and the utilization means need to be connected to each other by communication means such as a bus system. Moreover, external data may need to be communicated to the CPU and/or the utilization means on a corresponding way.

As an example, piezoelectric elements may be used as actuators in fuel injection nozzles (in particular in so-called common rail injectors) of an internal combustion engine. The use of piezoelectric elements with double acting, double seat valves to control corresponding injection needles in a fuel injection system is shown in German patent applications DE 197 42 073 A1 and DE 197 29 844 A1, which are incorporated by reference herein in their entirety.

Fuel injection systems using piezoelectric actuators are characterized by the fact that, to a first approximation, piezoelectric actuators exhibit a proportional relationship between applied voltage and the linear expansion. In a fuel injection nozzle, for example, implemented as a double acting, double seat valve to control the linear stroke of a needle for fuel injection into a cylinder of an internal combustion engine, the amount of fuel injected into a corresponding cylinder is a function of the time the valve is open, and in the case of the use of a piezoelectric element, the activation voltage applied to the piezoelectric element.

Figure 5:
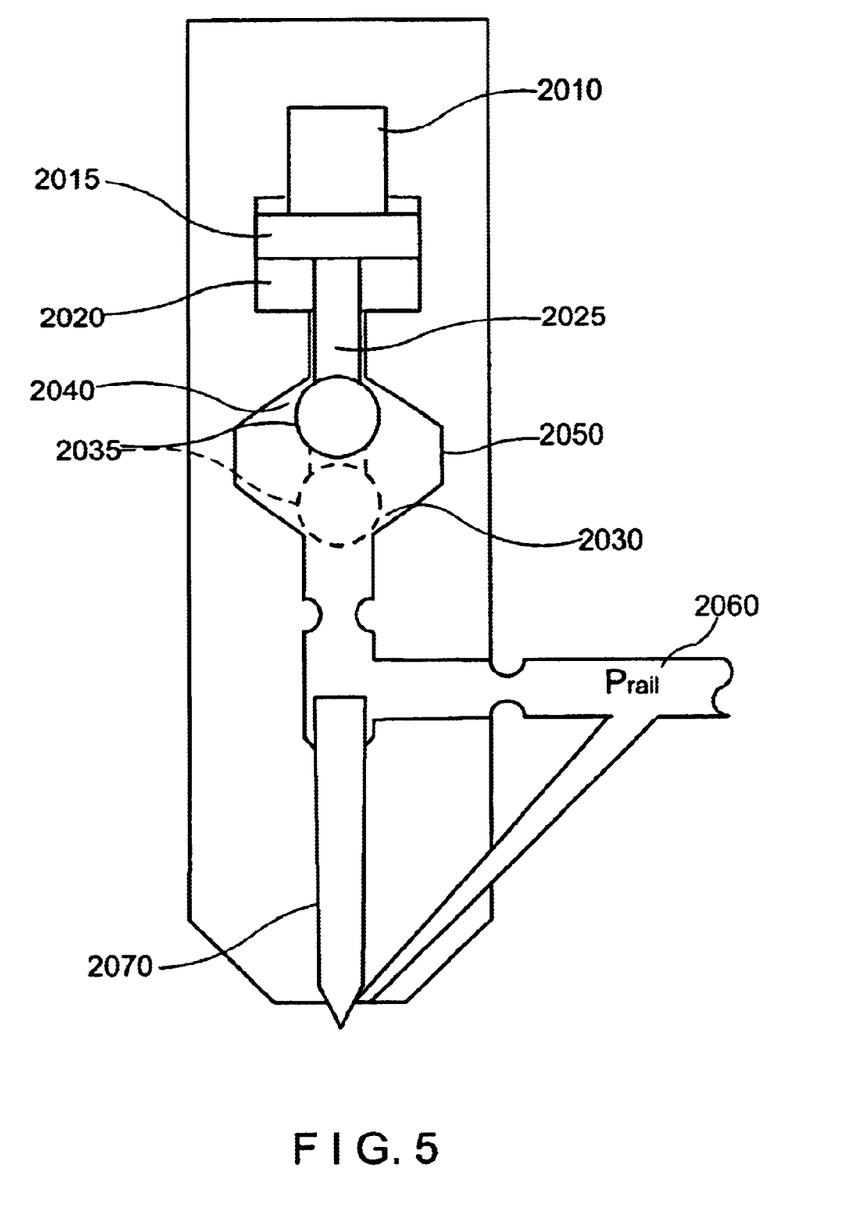
FIG. 5 shows a fuel injection system.

FIG. 5 is a schematic representation of a fuel injection system using a piezoelectric element 2010 as an actuator. Referring to FIG. 5, the piezoelectric element 2010 is electrically energized to expand and contract in response to a given activation voltage. The piezoelectric element 2010 is coupled to a piston 2015. In the expanded state, the piezoelectric element 2010 causes the piston 2015 to protrude into a hydraulic adapter 2020 which contains a hydraulic fluid, for example fuel. As a result of the piezoelectric element's expansion, a double acting control valve 2025 is hydraulically pushed away from hydraulic adapter 2020 and the valve plug 2035 is extended away from a first closed position 2040. The combination of double acting control valve 2025 and hollow bore 2050 is often referred to as double acting, double seat valve for the reason that when piezoelectric element 2010 is in an unexcited state, the double acting control valve 2025 rests in its first closed position 2040. On the other hand, when the piezoelectric element 2010 is fully extended, it rests in its second closed position 2030. The later position of valve plug 2035 is schematically represented with ghost lines in FIG. 5.

Figure 6A:
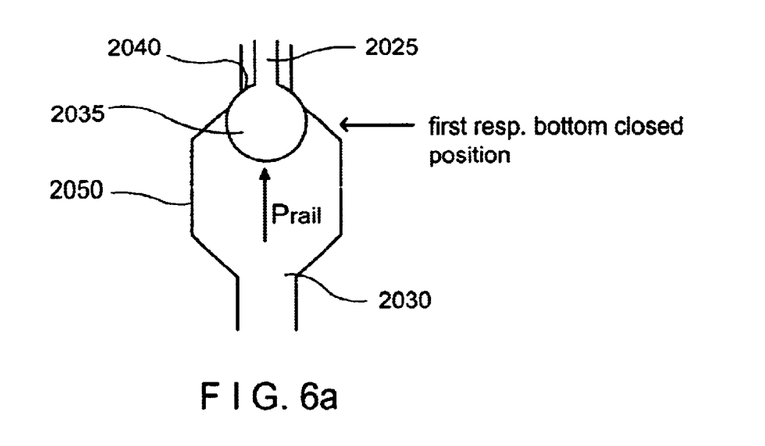
FIG. 6a show a schematic depiction of a double-acting control valve.
Figure 6B:
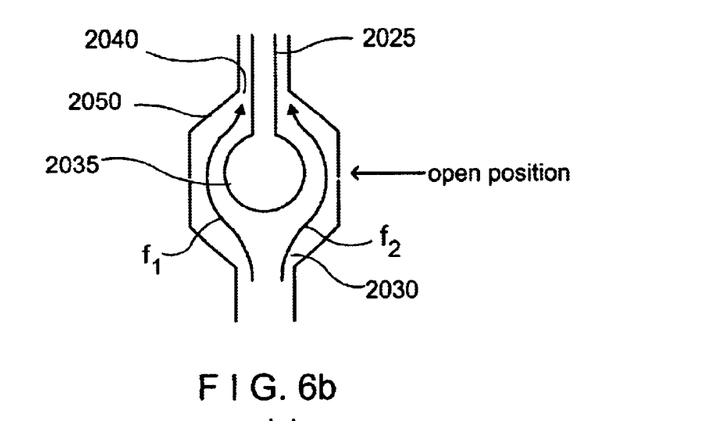
FIG. 6b show a schematic depiction of a double-acting control valve.
Figure 6C:
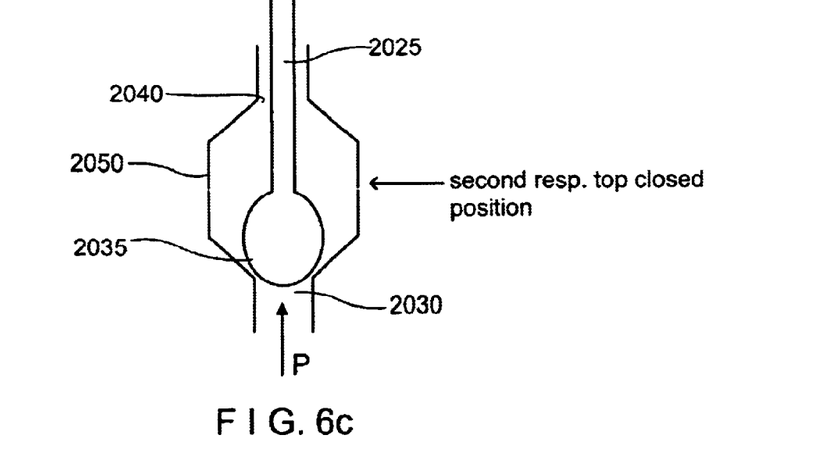
FIG. 6c show a schematic depiction of a double-acting control valve.

FIGS. 6a, 6b, and 6c show the double acting control valve in the first closed position, open position, and in the second closed position respectively.

The fuel injection system comprises an injection needle 2070 allowing for injection of fuel from a pressurized fuel supply line 2060 into the cylinder (not shown). When the piezoelectric element 2010 is unexcited or when it is fully extended, the double acting control valve 2025 rests respectively in its first closed position 2040 or in its second closed position 2030, as shown in FIGS. 6a and 6c, respectively. In either case, the hydraulic rail pressure maintains injection needle 2070 at a closed position. Thus, the fuel mixture does not enter into the cylinder (not shown). Conversely, when the piezoelectric element 2010 is excited such that double acting control valve 2025 is in the so-called mid-position with respect to the hollow bore 2050, then there is a pressure drop in the pressurized fuel supply line 2060. This situation is illustrated in FIG. 6b. This pressure drop results in a pressure differential in the pressurized fuel supply line 2060 between the top and the bottom of the injection needle 2070 so that the injection needle 2070 is lifted allowing for fuel injection into the cylinder (not shown).

Figure 7:
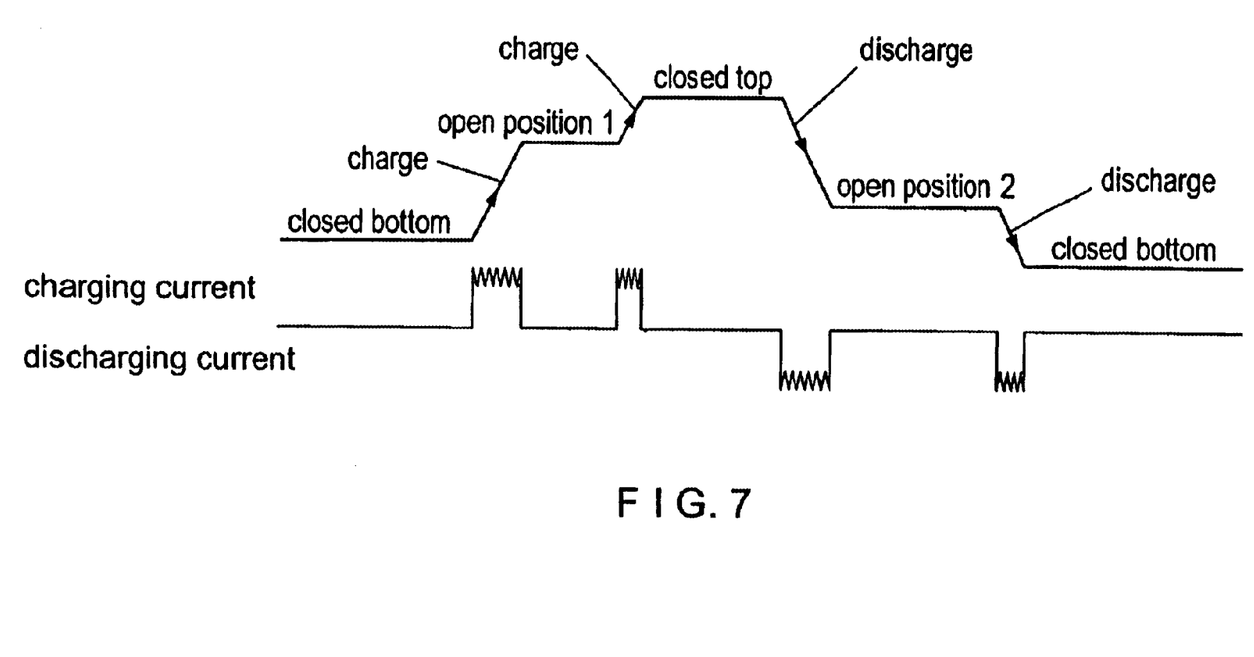
FIG. 7 shows a diagram of an injection cycle of a fuel injection system having a double-acting control valve.

Within the example of FIG. 7, the use of having two open positions resp. two voltages corresponding to open positions is as follows: Generally, it may be desired that the first and second open position of the valve plug 2035 within the hollow bore 2050 are equal to each other. However, in order to achieve this aim it has to be taken into account, that in one case the open position is approached from the first or bottom closed position and in the other case from the second or top closed position. While recalling FIG. 6a through FIG. 6c, this means, that in the first case the valve plug 2035 is moved against a force applied by the pressure $p_{rail}$ in the pressurized fuel supply line 2060 and in the second case it is moved with the force applied by the pressure $p_{rail}$ in the pressurized fuel supply line 2060. Hence, in the first case a larger force is to be applied than in the second case. Since the valve 2025 is driven by the piezoelectric element 2010, this again means, that in the first case a higher voltage is required than in the second case in order to obtain the desired expansion of the piezoelectric element and hence the desired open position of the valve plug 2035.

In addition, in the above example, the movement of the double-acting valve and hence of the injector needle is influenced by any changes of the occurring pressure $p_{rail}$, since so far it is only taken into account, that different voltages are required in order to similarly position the valve plug 2035 while moving it against and with the pressure $p_{rail}$. However, so far it is not taken into account what further modifications are required in order to deal with changing pressures $p_{rail}$ which occur in practice. In order to nevertheless control the movement of the injector needle with high precision respectively to control the corresponding amount of injected fuel with high precision these influences have to be taken into account. Hence, the occurring rail pressures are measured by measuring means and the target voltages which are to be applied to the piezoelectric elements for desired actions are modified in a corresponding way. As a result, a feedback system is implemented, in which rail pressures $p_{rail}$ are measured by measuring means, the measured values are communicated to the control unit, corresponding target voltages for the piezoelectric actuators are calculated within the control unit (for example by means of adding an offset to a more general target voltage) and are communicated from the control unit to an utilization unit, for example an activation IC, from which they are applied to the piezoelectric actuators.

It is to be understood, that the above examples are introduced only in order to allow a better understanding of the inventive approach However, any further environment, particularly having a single-acting control valve or using a double-acting control valve in a single acting mode (i.e. temporarily or permanently not using the second or top closed position of the valve plug 2035, for example due to very cold temperatures which may cause difficulties to a full expansion of the piezoelectric element 2010) may be an environment for the present invention without any limitations. Furthermore, any other driving profile than the one mentioned above may be used. Moreover, control systems having a totally different technical background may be an environment for the present invention as well.

In the control system of above examples as well as in other control systems, there is a need for obtaining a good correspondence of the target values and the obtained values of each control procedure in order to achieve a high precision of the performance of the controlled system. However, this is limited due to properties of each individual control system as according to the state of the art.

It is an object of the present invention, to provide an improved method and apparatus for controlling system parameters.

This object of the present invention is achieved by a method for controlling system parameters, in particular for controlling the voltage applied to piezoelectric elements within a circuit for charging and discharging piezoelectric elements. At least one control parameter for the control of a system parameter, in particular a target voltage for the voltage applied to a piezoelectric element is modified in view of at least one systematic error occurring during a first control procedure of the system parameter to obtain a corrected control parameter for a second and/or a further control of the system parameter.

An object of the present invention is further achieved by an apparatus, in particular eligible for usage with the inventive method, in which are implemented: modification means for the modification of system parameters according to at least one control parameter; measuring means for the measurement of the value of the resulting system parameter; comparison means for the comparison of the measured value to a predefined target value; and calculation means for the calculation of at least one control parameter for a further modification of the system parameter in accordance with differences occurring between the measured value and the target values.

As stated, the general approach of the invention is to improve the performance of the controlled system during future control procedures rather than during a first present control procedure (hence, as an example, within a first charging procedure a target voltage of 100 V is used in order to bring a piezoelectric element to a voltage of 100 V; however, after termination of the procedure, it turns out that in fact just a voltage of 90 V was achieved; hence, the next time when an element should be brought up to 100 V, a corrected target voltage of 110 V is used, since the foregoing experience teaches that there is a minus of 10 V while doing so; similarly, in case one element should be brought to a target of 150 V a corrected target of 160 V may be used and so on). Hence, an existing control system, in particular a system for controlling the voltage applied to piezoelectric elements within a circuit for charging and discharging piezoelectric elements, can be used without any (or without any significant) technical modifications of the system, and the performance is nevertheless improved for the major part of the control procedures. This in particular holds in case of a large number of control procedures during a typical application of the control system. Hence, the invention provides an inexpensive and elegant improvement of the performance of a control system.

Advantageous implementations of the invention are addressed. Corresponding implementations provide the advantage of modifying the desired voltage in order to substantially eliminate the systematic errors that occur within the control system and result in inaccurate control of the piezoelectric actuators.

The invention will be explained below in more detail with reference to exemplary embodiments, referring to the figures in which.

Figure 1:
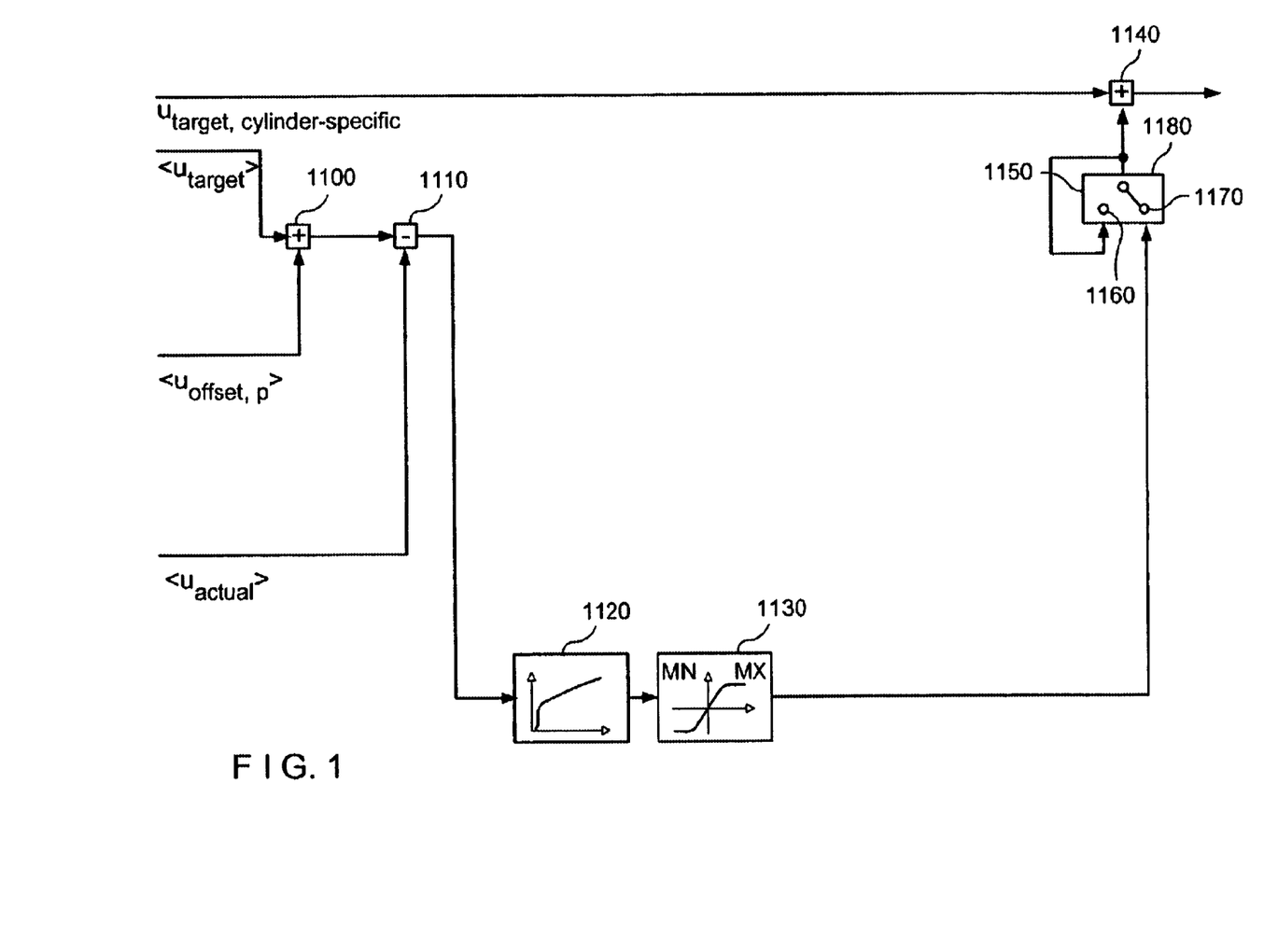
FIG. 1 schematically represents the voltage regulation system software according to an embodiment of this invention.
Figure 2:
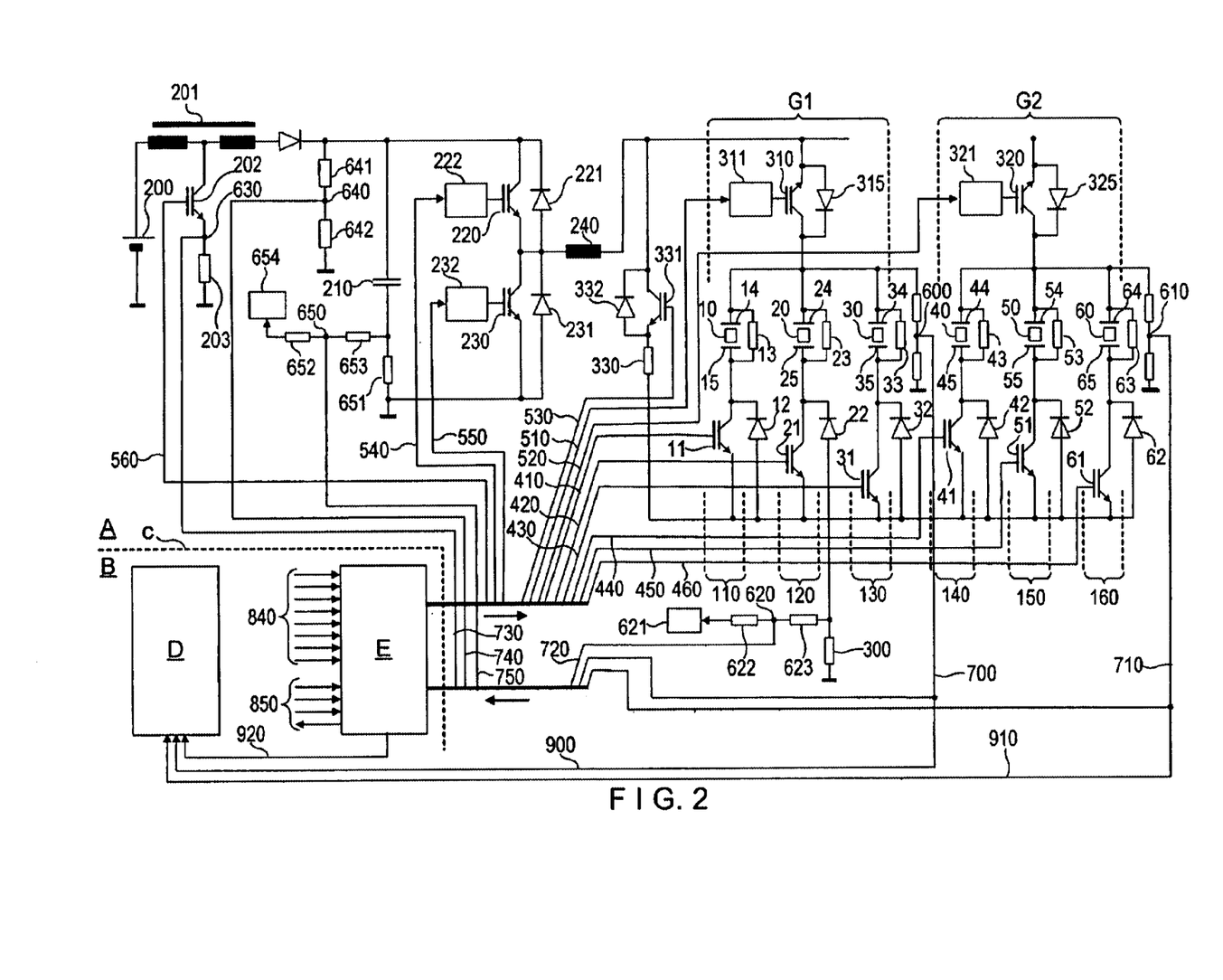
FIG. 2 shows a block diagram of an exemplary embodiment of an arrangement in which the present invention is applied and which can be utilized for an application of the inventive method.

The following description firstly introduces the individual elements of the exemplary embodiment of an arrangement in which the present invention is applied as depicted in FIG. 2. Then, the procedures of charging and discharging piezoelectric elements 10, 20, 30, 40, 50, 60 are described in general, while additionally referring to FIGS. 3a–3d. Thirdly, the ways both procedures are controlled by means of control unit D and activation IC E are explained in more detail, while referring to FIGS. 2 and 4. Fourthly, it is pointed out in general, how the exemplary control system is driven in accordance with the inventive method, and what the advantages are. Fifthly, a more detailed exemplary embodiment of the invention is described while further referring to FIG. 1 (the remaining FIGS. 5 through 7 are already described above; however, reference to this figures is made whenever this appears useful to allow a better understanding of the exemplary embodiments of the present invention).

As stated above, FIG. 2 provides a block diagram of an exemplary embodiment of an arrangement in which the present invention may be implemented.

In FIG. 2 there is a detailed area A and a non-detailed area B, the separation of which is indicated by a dashed line c. The detailed area A comprises a circuit for charging and discharging piezoelectric elements 10, 20, 30, 40, 50 and 60. In the example being considered these piezoelectric elements 10, 20, 30, 40, 50 and 60 are actuators in fuel injection nozzles (in particular in so-called common rail injectors) of an internal combustion engine. Piezoelectric elements can be used for such purposes because, as is known, and as discussed above, they possess the property of contracting or expanding as a function of a voltage applied thereto or occurring therein. The reason to take six piezoelectric elements 10, 20, 30, 40, 50 and 60 in the embodiment described is to independently control six cylinders within a combustion engine; hence, any other number of piezoelectric elements might match any other purpose.

The non-detailed area B comprises a control unit D and a activation IC E by both of which the elements within the detailed area A are controlled.

The piezoelectric elements 10, 20, 30, 40, 50 and 60 are distributed into a first group G1 and a second group G2, each comprising three piezoelectric elements (i.e. piezoelectric elements 10, 20 and 30 in the first group G1 resp. 40, 50 and 60 in the second group G2). Groups G1 and G2 are constituents of circuit parts connected in parallel with one another. Group selector switches 310, 320 can be used to establish which of the groups G1, G2 of piezoelectric elements 10, 20 and 30 resp. 40, 50 and 60 will be discharged in each case by a common charging and discharging apparatus (however, the group selector switches 310, 320 are meaningless for charging procedures, as is explained in further detail below).

The group selector switches 310, 320 are arranged between a coil 240 and the respective groups G1 and G2 (the coil-side terminals thereof) and are implemented as transistors. Side drivers 311, 321 are implemented which transform control signals received from the activation IC E into voltages which are eligible for closing and opening the switches as required.

Diodes 315 and 325 (referred to as group selector diodes), respectively, are provided in parallel with the group selector switches 310, 320. If the group selector switches 310, 320 are implemented as MOSFETs or IGETs, these group selector diodes 315 and 325 can be constituted by the parasitic diodes themselves. The diodes 315, 325 bypass the group selector switches 310, 320 during charging procedures. Hence, the functionality of the group selector switches 310, 320 is reduced to select a group G1, G2 of piezoelectric elements 10, 20 and 30, resp. 40, 50 and 60 for a discharging procedure only.

Within each group G1 resp. G2 the piezoelectric elements 10, 20 and 30, resp. 40, 50 and 60 are arranged as constituents of piezoelectric branches 110, 120 and 130 (group G1) and 140, 150 and 160 (group G2) that are connected in parallel. Each piezoelectric branch comprises a series circuit made up of a first parallel circuit comprising a piezoelectric element 10, 20, 30, 40, 50 resp. 60 and a resistor 13, 23, 33, 43, 53 resp. 63 (referred to as branch resistors) and a second parallel circuit made up of a selector switch implemented as a transistor 11, 21, 31, 41, 51 resp. 61 (referred to as branch selector switches) and a diode 12, 22, 32, 42, 52 resp. 62 (referred to as branch diodes).

The branch resistors 13, 23, 33, 43, 53 resp. 63 cause each corresponding piezoelectric element 10, 20, 30, 40, 50 resp. 60 during and after a charging procedure to continuously discharge themselves, since they connect both terminals of each capacitive piezoelectric element 10, 20, 30, 40, 50, resp. 60 one to another. However, the branch resistors 13, 23, 33, 43, 53 resp. 63 are sufficiently large to make this procedure slow compared to the controlled charging and discharging procedures as described below. Hence, it is still a reasonable assumption to consider the charge of any piezoelectric element 10, 20, 30, 40, 50 or 60 as unchanging within a relevant time after a charging procedure (the reason to nevertheless implement the branch resistors 13, 23, 33, 43, 53 and 63 is to avoid remaining charges on the piezoelectric elements 10, 20, 30, 40, 50 and 60 in case of a breakdown of the system or other exceptional situations). Hence, the branch resistors 13, 23, 33, 43, 53 and 63 may be neglected in the following description.

The branch selector switch/branch diode pairs in the individual piezoelectric branches 110, 120, 130, 140, 150 resp. 160, i.e. selector switch 11 and diode 12 in piezoelectric branch 110, selector switch 21 and diode 22 in piezoelectric branch 120, and so on, can be implemented using electronic switches (i.e. transistors) with parasitic diodes, for example MOSFETs or IGBTs (as stated above for the group selector switch/diode pairs 310 and 315 resp. 320 and 325).

The branch selector switches 11, 21, 31, 41, 51 resp. 61 can be used to establish which of the piezoelectric elements 10, 20, 30, 40, 50 or 60 will be charged in each case by a common charging and discharging apparatus: in each case, the piezoelectric elements 10, 20, 30, 40, 50 or 60 that are charged are all those whose branch selector switches 11, 21, 31, 41, 51 or 61 are closed during the charging procedure which is described below. Usually, at any time only one of the branch selector switches is closed.

The branch diodes 12, 22, 32, 42, 52 and 62 serve for bypassing the branch selector switches 11, 21, 31, 41, 51 resp. 61 during discharging procedures. Hence, in the example considered for charging procedures any individual piezoelectric element can be selected, whereas for discharging procedures either the first group G1 or the second group G2 of piezoelectric elements 10, 20 and 30 resp. 40, 50 and 60 or both have to be selected.

Returning to the piezoelectric elements 10, 20, 30, 40, 50 and 60 themselves, the branch selector piezoelectric terminals 15, 25, 35, 45, 55 resp. 65 may be connected to ground either through the branch selector switches 11, 21, 31, 41, 51 resp. 61 or through the corresponding diodes 12, 22, 32, 42, 52 resp. 62 and in both cases additionally through resistor 300.

The purpose of resistor 300 is to measure the currents that flow during charging and discharging of the piezoelectric elements 10, 20, 30, 40, 50 and 60 between the branch selector piezoelectric terminals 15, 25, 35, 45, 55 resp. 65 and the ground. A knowledge of these currents allows a controlled charging and discharging of the piezoelectric elements 10, 20, 30, 40, 50 and 60. In particular, by closing and opening charging switch 220 and discharging switch 230 in a manner dependent on the magnitude of the currents, it is possible to set the charging current and discharging current to predefined average values and/or to keep them from exceeding or falling below predefined maximum and/or minimum values as is explained in further detail below.

In the example considered, the measurement itself further requires a voltage source 621 which supplies a voltage of 5 V DC, for example, and a voltage divider implemented as two resistors 622 and 623. This is in order to prevent the activation IC E (by which the measurements are performed) from negative voltages which might otherwise occur on measuring point 620 and which cannot be handled by means of activation IC E: such negative voltages are changed into positive voltages by means, of addition with a positive voltage setup which is supplied by said voltage source 621 and voltage divider resistors 622 and 623.

The other terminal of each piezoelectric element 10, 20, 30, 40, 50 and 60, i.e. the group selector piezoelectric terminal 14, 24, 34, 44, 54 resp. 64, may be connected to the plus pole of a voltage source via the group selector switch 310 resp. 320 or via the group selector diode 315 resp. 325 as well as via a coil 240 and a parallel circuit made up of a charging switch 220 and a charging diode 221, and alternatively or additionally connected to ground via the group selector switch 310 resp. 320 or via diode 315 resp. 325 as well as via the coil 240 and a parallel circuit made up of a discharging switch 230 or a discharging diode 231. Charging switch 220 and discharging switch 230 are implemented as transistors, for example, which are controlled via side drivers 222 resp. 232.

The voltage source comprises an element having capacitive properties which, in the example being considered, is the (buffer) capacitor 210. Capacitor 210 is charged by a battery 200 (for example a motor vehicle battery) and a DC voltage converter 201 downstream therefrom. DC voltage converter 201 converts the battery voltage (for example, 12 V) into substantially any other DC voltage (for example 250 V), and charges capacitor 210 to that voltage. DC voltage converter 201 is controlled by means of transistor switch 202 and resistor 203 which is utilized for current measurements taken from a measuring point 630.

For cross check purposes, a further current measurement at a measuring point 650 is allowed by activation IC E as well as by resistors 651, 652 and 653 and a 5 V DC voltage, for example, source 654; moreover, a voltage measurement at a measuring point 640 is allowed by activation IC E as well as by voltage dividing resistors 641 and 642.

Finally, a resistor 330 (referred to as total discharging resistor), a stop switch implemented as a transistor 331 (referred to as stop switch), and a diode 332 (referred to as total discharging diode) serve to discharge the piezoelectric elements 10, 20, 30, 40, 50 and 60 (if they happen to be not discharged by the "normal" discharging operation as described further below). Stop switch 331 is preferably closed after "normal" discharging procedures (cycled discharging via discharge switch 230). It thereby connects piezoelectric elements 10, 20, 30, 40, 50 and 60 to ground through resistors 330 and 300, and thus removes any residual charges that might remain in piezoelectric elements 10, 20, 30, 40, 50 and 60. The total discharging diode 332 prevents negative voltages from occurring at the piezoelectric elements 10, 20, 30, 40, 50 and 60, which might in some circumstances be damaged thereby.

Charging and discharging of all the piezoelectric elements 10, 20, 30, 40, 50 and 60 or any particular one is accomplished by way of a single charging and discharging apparatus (common to all the groups and their piezoelectric elements). In the example being considered, the common charging and discharging apparatus comprises battery 200, DC voltage converter 201, capacitor 210, charging switch 220 and discharging switch 230, charging diode 221 and discharging diode 231 and coil 240.

The charging and discharging of each piezoelectric element works the same way and is explained in the following while referring to the first piezoelectric element 10 only.

Figure 3A:
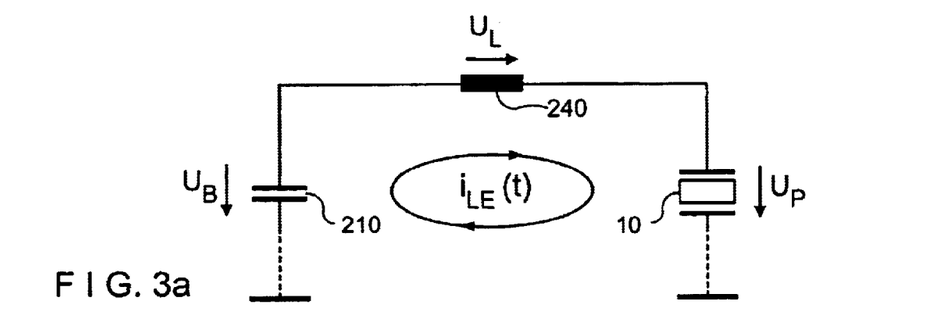
FIG. 3a shows a depiction to explain the conditions occurring during a first charging (charging switch 220 closed) in the circuit of FIG. 1.
Figure 3B:
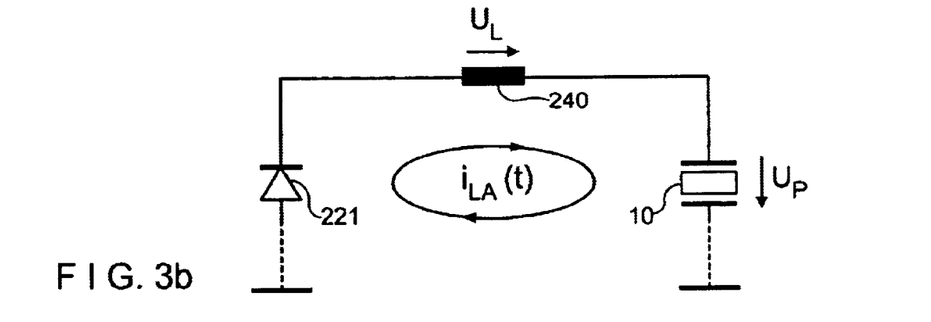
FIG. 3b shows a depiction to explain the conditions occurring during a second charging phase (charging switch 220 open again) in the circuit of FIG. 1.

The conditions occurring during the charging and discharging procedures are explained with reference to FIGS. 3a through 3d, of which FIGS. 3a and 3b illustrate the charging of piezoelectric element 10, and FIGS. 3c and 3d the discharging of piezoelectric element 10.

The selection of one or more particular piezoelectric elements 10, 20, 30, 40, 50 or 60 to be charged or discharged, the charging procedure as described in the following as well as the discharging procedure are driven by activation IC E and control unit D by means of opening or closing one or more of the above introduced switches 11, 21, 31, 41, 51, 61; 310, 320; 220, 230 and 331. The interactions between the elements within the detailed area A on the one hand and activation IC E and control unit D on the other hand are described in detail further below.

Concerning the charging procedure, firstly any particular piezoelectric element 10, 20, 30, 40, 50 or 60 which is to be charged has to be selected. In order to exclusively charge the first piezoelectric element 10, the branch selector switch 11 of the first branch 110 is closed, whereas all other branch selector switches 21, 31, 41, 51 and 61 remain opened. In order to exclusively charge any other piezoelectric element 20, 30, 40, 50, 60 or in order to charge several ones at the same time they would be selected by closing the corresponding branch selector switches 21, 31, 41, 51 and/or 61.

Then, the charging procedure itself may take place:

Generally, within the example considered, the charging procedure requires a positive potential difference between capacitor 210 and the group selector piezoelectric terminal 14 of the first piezoelectric element 10. However, as long as charging switch 220 and discharging switch 230 are open no charging or discharging of piezoelectric element 10 occurs: In this state, the circuit shown in FIG. 2 is in a steady-state condition, i.e. piezoelectric element 10 retains its charge state in substantially unchanged fashion, and no currents flow.

In order to charge the first piezoelectric element 10, charging switch 220 is closed. Theoretically, the first piezoelectric element 10 could become charged just by doing so. However, this would produce large currents which might damage the elements involved. Therefore, the occurring currents are measured at measuring point 620 and switch 220 is opened again as soon as the detected currents exceed a certain limit. Hence, in order to achieve any desired charge on the first piezoelectric element 10, charging switch 220 is repeatedly closed and opened whereas discharging switch 230 remains open.

In more detail, when charging switch 220 is closed, the conditions shown in FIG. 3a occur, i.e. a closed circuit comprising a series circuit made up of piezoelectric element 10, capacitor 210, and coil 240 is formed, in which a current $i_{LE}$ (t) flows as indicated by arrows in FIG. 3a. As a result of this current flow both positive charges are brought to the group selector piezoelectric terminal 14 of the first piezoelectric element 10 and energy is stored in coil 240.

When charging switch 220 opens shortly (for example, a few $\mu$s) after it has closed, the conditions shown in FIG. 3b occur: a closed circuit comprising a series circuit made up of piezoelectric element 10, charging diode 221, and coil 240 is formed, in which a current $i_{La}$ (t) flows as indicated by arrows in FIG. 3b The result of this current flow is that energy stored in coil 240 flows into piezoelectric element 10. Corresponding to the energy delivery to the piezoelectric element 10, the voltage occurring in the latter, and its external dimensions, increase. Once energy transport has taken place from coil 240 to piezoelectric element 10, the steady-state condition of the circuit, as shown in FIG. 2 and already described, is once again attained.

At that time, or earlier, or later (depending on the desired time profile of the charging operation), charging switch 220 is once again closed and opened again, so that the processes described above are repeated. As a result of the re-closing and re-opening of charging switch 220, the energy stored in piezoelectric element 10 increases (the energy already stored in the piezoelectric element 10 and the newly delivered energy are added together), and the voltage occurring at the piezoelectric element 10, and its external dimensions, accordingly increase.

If the aforementioned closing and opening of charging switch 220 are repeated numerous times, the voltage occurring at the piezoelectric element 10, and the expansion of the piezoelectric element 10, rise in steps.

Once charging switch 220 has closed and opened a predefined number of times, and/or once piezoelectric element 10 has reached the desired charge state, charging of the piezoelectric element is terminated by leaving charging switch 220 open.

Concerning the discharging procedure, in the example considered, the piezoelectric elements 10, 20, 30, 40, 50 and 60 are discharged in groups (G1 and/or G2) as follows:

Firstly, the group selector switch(es) 310 and/or 320 of the group or groups G1 and/or G2 the piezoelectric elements of which are to be discharged are closed (the branch selector switches 11, 21, 31, 41, 51, 61 do not affect the selection of piezoelectric elements 10, 20, 30, 40, 50, 60 for the discharging procedure, since in this case they are bypassed by the branch diodes 12, 22, 32, 42, 52 and 62). Hence, in order to discharge piezoelectric element 10 as a part of the first group 51, the first group selector switch 310 is closed.

Figure 3C:
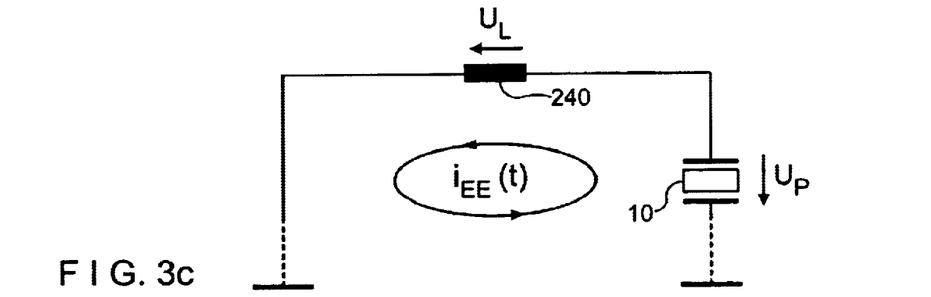
FIG. 3c shows a depiction to explain the conditions occurring during a first discharging phase (discharging switch 230 closed) in the circuit of FIG. 1.

When discharging switch 230 is closed, the conditions shown in FIG. 3c occur: a closed circuit comprising a series circuit made up of piezoelectric element 10 and coil 240 is formed, in which a current $i_{EE}$ (t) flows as indicated by arrows in FIG. 3c. The result of this current flow is that the energy (a portion thereof) stored in the piezoelectric element is transported into coil 240. Corresponding to the energy transfer from piezoelectric element 10 to coil 240, the voltage occurring at the piezoelectric element 10, and its external dimensions, decrease.

Figure 3D:
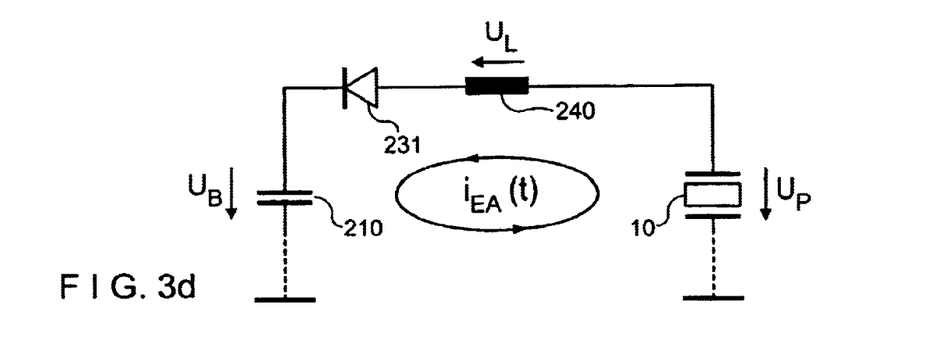
FIG. 3d shows a depiction to explain the conditions occurring during a second discharging phase (discharging switch 230 open again) in the circuit of FIG. 1.

When discharging switch 230 opens shortly (for example, a few µs) after it has closed, the conditions shown in FIG. 3d occur: a closed circuit comprising a series circuit made up of piezoelectric element 10, capacitor 210, discharging diode 231, and coil 240 is formed, in which a current $i_{EA}$ (t) flows as indicated by arrows in FIG. 3d. The result of this current flow is that energy stored in coil 240 is fed back into capacitor 210. Once energy transport has taken place from coil 240 to capacitor 210, the steady-state condition of the circuit, as shown in FIG. 2 and already described, is once again attained.

At that time, or earlier, or later (depending on the desired time profile of the discharging operation), discharging switch 230 is once again closed and opened again, so that the processes described above are repeated. As a result of the re-closing and re-opening of discharging switch 230, the energy stored in piezoelectric element 10 decreases further, and the voltage occurring at the piezoelectric element, and its external dimensions, also accordingly decrease.

If the aforementioned closing and opening of discharging switch 230 are repeated numerous times, the voltage occurring at the piezoelectric element 10, and the expansion of the piezoelectric element 10, decrease in steps.

Once discharging switch 230 has closed and opened a predefined number of times, and/or once the piezoelectric element has reached the desired discharge state, discharging of the piezoelectric element 10 is terminated by leaving discharging switch 230 open.

The interaction between activation IC E and control unit D on the one hand and the elements within the detailed area A on the other hand is performed by control signals sent from activation IC E to elements within the detailed area A via branch selector control lines 410, 420, 430, 440, 450, 460, group selector control lines 510, 520, stop switch control line 530, charging switch control line 540 and discharging switch control line 550 and control line 560. On the other hand, there are sensor signals obtained on measuring points 600, 610, 620, 630, 640, 650 within the detailed area A which are transmitted to activation IC E via sensor lines 700, 710, 720, 730, 740, 750.

The control lines are used to apply or not to apply voltages to the transistor bases in order to select piezoelectric elements 10, 20, 30, 40, 50 or 60, to perform charging or discharging procedures of single or several piezoelectric elements 10, 20, 30, 40, 50, 60 by means of opening and closing the corresponding switches as described above. The sensor signals are particularly used to determine the resulting voltage of the piezoelectric elements 10, 20 and 30, resp. 40, 50 and 60 from measuring points 600 resp. 610 and the charging and discharging currents from measuring point 620 The control unit D and the activation IC E are used to combine both kinds of signals in order to perform an interaction of both as will be described in detail now while referring to FIGS. 2 and 4.

As is indicated in FIG. 2, the control unit D and the activation IC E are connected to each other by means of a parallel bus 840 and additionally by means of a serial bus 850. The parallel bus 840 is particularly used for fast transmission of control signals from control unit D to the activation IC E, whereas the serial bus 850 is used for slower data transfer.

Figure 4:
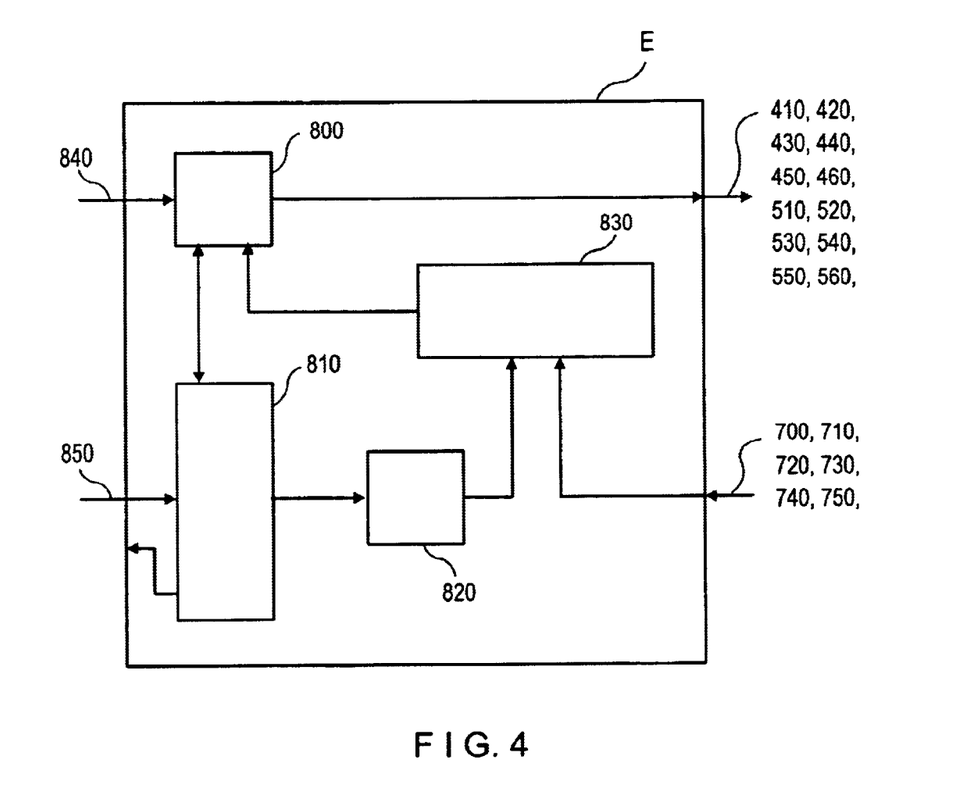
FIG. 4 shows a block diagram of components of the activation IC E which is also shown in FIG. 1.

In FIG. 4 some components are indicated, which the activation IC E comprises: a logic circuit 800, REM memory 810, digital to analog converter system 820 and comparator system 830. Furthermore, it is indicated that the fast parallel bus 840 (used for control signals) is connected to the logic circuit 800 of the activation IC E, whereas the slower serial bus 850 is connected to the RAM memory 810. The logic circuit 800 is connected to the RAM memory 810, to the comparator system 830 and to the signal lines 410, 420, 430, 440, 450 and 460; 510 and 520; 530; 540, 550 and 560. The RAM memory 810 is connected to the logic circuit 800 as well as to the digital to analog converter system 820. The digital to analog converter system 820 is further connected to the comparator system 830. The comparator system 830 is further connected to the sensor lines 700 and 710; 720; 730, 740 and 750 and—as already mentioned—to the logic circuit 800.

The above listed components may be used in a charging procedure for example as follows:

By means of the control unit D a particular piezoelectric element 10, 20, 30, 40, 50 or 60 is determined which is to be charged to a certain target voltage. Hence, firstly the value of the target voltage (expressed by a digital number) is transmitted to the RAM memory 810 via the slower serial bus 850. Later or simultaneously, a code corresponding to the particular piezoelectric element 10, 20, 30, 40, 50 or 60 which is to be selected and the address of the desired voltage within the RAM memory 810 is transmitted to the logic circuit 800 via the parallel bus 840. Later on, a strobe signal is sent to the logic circuit 800 via the parallel bus 840 which gives the start signal for the charging procedure.

The start signal firstly causes the logic circuit 800 to pick up the digital value of the target voltage from the RAM memory 810 and to put it on the digital to analog converter system 820 whereby at one analog exit of the converters 820 the desired voltage occurs. Moreover, said analog exit (not shown) is connected to the comparator system 830. In addition hereto, the logic circuit 800 selects either measuring point 600 (for any of the piezoelectric elements 10, 20 or 30 of the first group G1) or measuring point 610 (for any of the piezoelectric elements 40, 50 or 60 of the second group G2) to the comparator system 830. Resulting thereof, the target voltage and the present voltage at the selected piezoelectric element 10, 20, 30, 40, 50 or 60 are compared by the comparator system 830. The results of the comparison, i.e. the differences between the target voltage and the present voltage, are transmitted to the logic circuit 800. Thereby, the logic circuit 800 can stop the procedure as soon as the target voltage and the present voltage are equal to one another.

Secondly, the logic circuit 800 applies a control signal to the branch selector switch 11, 21, 31, 41, 51 or 61 which corresponds to any selected piezoelectric element 10, 20, 30, 40, 50 or 60 so that the switch becomes closed (all branch selector switches 11, 21, 31, 41, 51 and 61 are considered to be in an open state before the onset of the charging procedure within the example described). Then, the logic circuit 800 applies a control signal to the charging switch 220 so that the switch becomes closed. Furthermore, the logic circuit 800 starts (or continues) measuring any currents occurring on measuring point 620. Hereto, the measured currents are compared to any predefined maximum value by the comparator system 830. As soon as the predefined maximum value is achieved by the detected currents, the logic circuit 800 causes the charging switch 220 to open again.

Again, the remaining currents at measuring point 620 are detected and compared to any predefined minimum value. As soon as said predefined minimum value is achieved, the logic circuit 800 causes the charging switch 220 to close again and the procedure starts once again.

The closing and opening of the charging switch 220 is repeated as long as the detected voltage at measuring point 600 or 610 is below the target voltage. As soon as the target voltage is achieved, the logic circuit stops the continuation of the procedure.

The discharging procedure takes place in a corresponding way: Now the selection of the piezoelectric element 10, 20, 30, 40, 50 or 60 is obtained by means of the group selector switches 310 resp. 320, the discharging switch 230 instead of the charging switch 220 is opened and closed and a predefined minimum target voltage is to be achieved.

The timing of the charging and discharging operations and the holding of voltage levels in the piezoelectric elements 10, 20, 30, 40, 50 or 60, as for example, the time of a main injection, can be according to a valve stroke of a double acting valve having two closed and one or more desired open positions, as shown, for example, in FIG. 6a through FIG. 6c and described above.

While charging or discharging the piezoelectric elements 10, 20, 30, 40, 50 and/or 60 as described above, the following problems of relevance for the present invention occur resp. may occur:

Firstly, the obtained voltage as measured during the loading procedure (i.e. as long as there are currents) at measuring points 600 resp. 610 is not exactly the voltage which is applied across any piezoelectric element 10, 20, 30, 40, 50 or 60. Instead, it corresponds to the sum of the voltages across the piezoelectric element 10, 20, 30, 40, 50, or 60, across the wiring, across the branch selector switch 11, 21, 31, 41, 51 or 61, and—depending on the concrete action—across shunts like the branch diodes 12, 22, 32, 42, 52 or 62, or branch resistors 13, 23, 33, 43, 53 or 63. Hence, in case this is not taken into account, the obtained voltage will be smaller than the target voltage since the charging procedure is terminated as soon as the measured voltage is equal to the target voltage.

Secondly, when the obtained voltage is equal to the target voltage in general there are still currents present. Hence, while these currents fade away after the charging or discharging procedure is terminated, the voltage across the piezoelectric element 10, 20, 30, 40, 50 resp. 60 is further increased resp. decreased. Hence, in case of charging procedures the first and the second effect (partly) cancel each other whereas in discharging procedures they add to each other.

Moreover, the second effect is increased due to communication delays. This is, because the gradient of the charging current lies in the range of up to 10 A/$\mu$sec and because the switches used within the above described examples for current regulation and the driver logic have switching times of up to 1 $\mu$sec. Hence, the desired amount of charging current is exceeded by up to 10 A.

Further systematical errors occur or may occur due to the tolerance of D/A converters, the comparator, and delays of the components used in the voltage path. Additionally there are effects like voltages caused from corresponding pressures applied to the actuator at the moment target voltage is reached.

As a result, without implementation of the invention, there would be deviating voltages that would lead to tolerances of the injected fuel quantity. This is especially significant where the piezoelectric actuator resp. the valve is in any "open" position.

Introducing now the inventive method, after the determination of the charging or discharging procedure the voltage across the piezoelectric element 10, 20, 30, 40, 50 or 60 of interest, resp. across its corresponding group G1 or G2, is re-measured. From this corrective parameters for further charging or discharging procedures are obtained. Hence, over the time the effects according to the above described problems are reduced. The implementation of the inventive method within the exemplary environment is explained in further detail below:

Firstly, the re-measured voltages across any piezoelectric element 10, 20, 30, 40, 50 or 60 are taken from the measuring points 600 or 610, as indicated in FIG. 2. Hence, the re-measurement can be done by the same measuring components within the activation IC E, which are also used for the measurement of the obtained voltages during the charging or discharging procedures. However, this would require a transmission of the obtained values from the activation IC E to the control unit D by transmission components 920. On the other hand, the measurement can be done by measuring components within the control unit D as well. According hereto, direct lines 900 resp. 910 between the measuring points 600 resp. 610 would be required. In both cases, after the re-measurement (and the transmission) of the voltage across the piezoelectric element 10, 20, 30, 40, 50 or 60 of relevance, the corresponding values are available within the control unit D.

Moreover, the re-measuring has to be done in the time between the charging and the discharging of any piezoelectric element 10, 20, 30, 40, 50 or 60 (or vice versa). More precisely, the measurement should not take place before any remaining currents have substantially faded out. In order to achieve this goal, either the present currents are measured from measuring point 620 or any safe time delay after the determination of each procedure is considered.

Then, the re-measured obtained voltage is compared to the target voltage of the corresponding charging or discharging procedure. Thereby, the target voltage itself may already have been corrected as according to foregoing charging or discharging procedures. Hence, it could be taken into account, what the initial target voltage (i.e. the voltage value which should have been obtained across any piezoelectric element 10, 20, 30, 40, 50 or 60) was and how it was changed due to foregoing differences between obtained and target voltages (i.e. any offsets added to the initial target voltage). On the other hand, in principle it is sufficient just to compare the target voltage and the corresponding obtained voltage. For this reason, the comparison can be done—for example—by means of subtracting the voltage obtained from its corresponding target voltage. Hence, the system is taught what (positive or negative) offset is required in order to achieve a certain voltage across one controlled element. Alternatively, instead of subtracting the obtained voltage and the corresponding target voltage from each other, the comparison can be done by means of converting the control parameter corresponding to the target voltage into a voltage by means of a digital to analog converter and comparing both the converted target voltage and the voltage applying on measuring point 600 resp. 610 by comparison means (not shown).

Next, the difference between the target voltage and the obtained voltage is utilized while correcting any further target voltage. Additionally, the absolute values of the initial target voltage and/or the obtained voltage, the value of the foregoing obtained voltage, the kind of the foregoing and of the next procedure (i.e. charging or discharging procedure) or any other eligible parameter may be taken into account.

The correction itself can be implemented on several ways, as is shown in the following examples:

As a first approach, the correction is implemented as an offset which is added to the initial target voltage of the next charging or discharging procedure. The offset may comprise a positive or a negative value. It is calculated as the absolute difference between a foregoing target voltage and the corresponding obtained voltage, i.e. the obtained voltage is subtracted from the corresponding (corrected) target voltage and the result is used as an offset for a further charging or discharging procedure. Hence, in case the (corrected) target voltage was 110 V, but the obtained voltage was 100 V, the difference is +10 V and hence an offset of +10 V is added as a correction to the initial target voltage of a further procedure (even though the foregoing procedure only teaches, that in order to obtain a voltage of 100 V a corrected target voltage of 110 V has to be used). As a result, in order to obtain a voltage of 150 V within the next procedure a corrected target voltage of 160 V is used.

However, so far it has not been taken into account, if the foregoing procedure was a charging or a discharging procedure and what the next procedure is supposed to be. On the other hand, as mentioned above, there are two effects which have to be corrected: On the one hand, the measured voltage is during any procedure increased by the voltages across further components of the circuit Hence, the in fact obtained voltage across any piezoelectric element 10, 20, 30, 40, 50 resp. 60 is decreased. On the other hand, depending on whether the foregoing procedure was a charging or a discharging procedure, the voltage is increased resp. decreased by currents which remain after termination of the procedure, respectively. Hence, in case of discharging procedures both effects add to each other, whereas in case of charging procedures they (partly) cancel each other. For this reason, an offset which is calculated as described above, can only be used for the same kind of procedure as the one the offset corresponds to.

Furthermore, instead of just using the result of the subtraction of the obtained voltage from the corrected (or initial) target voltage, the corresponding relative number can be used. Hence, in the aforementioned example of a target voltage of 110 V and a obtained voltage of 100 V, firstly the relative difference is calculated as [(110−100)/(100/100)]%= (10/1,0)%=10%, i.e. the foregoing procedure teaches, that in order to achieve a voltage of 100 V a target voltage which is increased by 10% to 110 V needs to be applied. Then, in case the next initial target value is 150 V a corresponding corrected target voltage is calculated by adding an offset of 10%, i.e. 150 V+(150 V*0,10)=165 V.

In case, there are non-linear coherences, the offsets may be calculated in any other corresponding way. Moreover, instead of just using the values corresponding to one procedure, such values as corresponding to a plurality of charging resp. discharging procedures may be used. Furthermore, in case there are coherences between the offsets for charging procedures and for discharging procedures, the corresponding offsets may be deduced from one another. Then, in case there are specific effects according to the individual piezoelectric elements 10, 20, 30, 40, 50 or 60 separate offsets for each of them may be calculated. It is also possible, to store offsets for each action and each corresponding initial target voltage for each piezoelectric element 10, 20, 30, 40, 50 and 60 and to update each of them after each corresponding charging or discharging procedure. Moreover, instead of adding an offset, the correction of a target voltage can be done by means of multiplying the initial target voltage by a factor which is smaller or larger than 1 (for example 1,10 or 0,90) or on any other suitable way.

In the following, an exemplary software implementation of the invention is described in greater detail while referring to FIG. 1. This exemplary implementation of the invention may be used with a driving profile as shown in FIG. 6 and as described above, i.e., with a driving profile for a double-acting control valve having a first or bottom closed position, a first or up open position, a second or top closed position and a second or down open position (as mentioned above, by "bottom", "down","up" and "top", it is referred to the corresponding minimum, lower medium, higher medium and maximum voltage).

The up-open position is used while charging the piezoelectric element 10 from its bottom closed position into its open position and the down-open position is used while discharging the piezoelectric element 10 from its top closed position into its open position. Hence, each open position is exclusively used for charging resp. discharging procedures. As a result, the above mentioned different net effects of occurring systematical errors during charging and discharging procedures (i.e., the partly cancellation of some effects during charging procedures resp. the addition of some effects during discharging procedures) can be taken into account by simply separately treating the up- and down-open positions in the correction procedure.

Referring now to FIG. 1, there is a general depiction of the way a correction factor or value for each position (i.e. top closed position, up-open position, down-open position and bottom position) may be obtained. Thereby, an individual correction factor or value is obtained for each position but not for each cylinder-specific target voltage corresponding to this position, i.e., each single correction factor (for top, up, down or bottom) is used for the correction of all cylinder-specific target voltages for all piezoelectric elements 10, 20, 30, 40, 50 and 60 corresponding to the same position (top, up, down or bottom). This is because the systematic errors which are to be corrected by the invention are mostly related to non-cylinder-specific effects and therefore it is desired to minimize the proportion of actuator-specific errors in the calculation. Moreover, for the closed positions simplifications are possible: Firstly, concerning the top closed position, generally there are no cylinder-specific target voltages used and hence are corresponding averaging is unnecessary; secondly, it is generally possible to omit any correction for the bottom closed position since this is for example obtained by simply essentially completely discharging the piezoelectric elements and not by precisely adjusting it to a desired voltage.

In more detail, the following input data are used for applying the inventive method on the control of the voltage across a piezoelectric element 10, 20, 30, 40, 50 or 60 corresponding to at least any desired open position:

$<U_{target}>$, i.e., the filtered average cylinder-specific target voltage for a plurality of piezoelectric actuators 10, 20, 30, 40, 50, 60 corresponding to the desired open position. The averaging, for example, takes place by means of adding the six cylinder-specific target voltages for the six piezoelectric elements 10, 20, 30, 40, 50 and 60 of the above example corresponding to the desired position and dividing the resulting value by six.

$<U_{offset,p}>$, i.e., the filtered average cylinder-specific voltage offset for the cylinder-specific target voltage corresponding to dependencies of the system on changes of the pressure (which are described above). The reason for taking into account the pressure dependent offsets is, that a correspondingly modified target voltage is used for charging the piezoelectric elements and the voltages resulting thereof are to be compared with the correspondingly modified target voltages.

$<U_{actual}>$, i.e., the filtered averaged cylinder-specific voltages which were obtained by charging procedures in which the above target voltages and offsets were used and which were measured after each charging procedure was terminated.

The averaged target voltage $<U_{target}>$ and the averaged offset voltage $<U_{offset,p}>$ are added to each other at adding point 1100 in order to obtain the modified average target voltage which was actually used during the corresponding charging procedures. Then the averaged measured actual voltage $<U_{actual}>$ is subtracted from the first result at subtraction point 1110. The so obtained difference is kept in a PI-controller 1120 and a corresponding output of the PI-controller 1120 is used as offset for the correction of a future control procedure (for safety purposes, said offset is further limited between a minimum and a maximum value as indicated by limitation box 1130; by this, offsets are avoided which would modify the target voltages too much, i.e., in a way which could not possibly correspond to a systematical error in a given application). Therefore, the so obtained offset is added to any cylinder-specific target voltage $U_{target, cylinder-specific}$ at addition point 1140.

Hence, for six cylinders resp. six piezoelectric elements 10, 20, 30, 40, 50 and 60 each having its own cylinder-specific target voltage for the position (i.e. the voltage level, such as up-open or down-open position) which is corrected, either six addition points 1140 are required or the six cylinder-specific target voltages $U_{target,cylinder-specific}$ are corrected at the addition point 1140 one after each other. Moreover, it is possible, to have a further maximum/minimum limitation (not shown) for the resulting corrected target voltages behind the addition point 1140.

Repeating the above described procedure over the time makes it possible to implement an adaptive learning procedure. Moreover, further diagnostic features may be implemented.

Furthermore, "freezing" the offsets (i.e. keeping the last correction offset) for voltages that have temporarily not been approached may be useful and hence a corresponding freezing switch 1150 serving as memory element and described in further detail below should be implemented in the logic as described above.

A corresponding situation, for example, occurs, while using the double-acting control valve in a single acting mode, i.e., just using its bottom closed and its up-open position. This again, for example, is necessary in situations, in which the top-closed position corresponding to a full expansion of the piezoelectric elements 10, 20, 30, 40, 50 and 60 due to a maximum voltage applied cannot be or cannot accurately be performed due to very low temperatures etc. In such situation, the top closed position corresponding to the maximum voltage as well as the down-open position for a discharging procedure following thereon are not approached at all and hence any measurement results must not be compared with corresponding target values because this would lead to wrong results resp. wrong offset values if corresponding values would be stored. On the other hand, if the last offset value is "frozen", i.e. remains stored, it can be used for a later approach of the temporarily omitted voltage corresponding to these positions. Since "freezing" is possible over a lengthy time because the systematic error is relatively stable, this would still lead to reasonable results.

The freezing switch 1150 has two inputs 1160, 1170 and one output 1180. To one input 1170 the output of the maximum/minimum box 1130 is connected. The other input 1160 is connected to the own output of the switch 1180. Hence, either the currently obtained offset passes through the switch from the one input 1170 to the output 1180 or the last obtained offset remains stored between the other input 1160 and the output 1180 (which requires, that the switch is an active electrical component).

The above described logical components, for example, are implemented in the control unit D either by hardware means or by software means. The resulting corrected cylinder-specific target voltages are communicated to the activation IC E by means of the serial bus 850 of FIG. 2.

In an embodiment of the present invention, a method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), includes modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter, in which an offset is stored as long as a corresponding position of the piezoelectric elements (10, 20, 30, 40, 50 and 60) is not used.

It is to be understood, that the above description of embodiments of the invention serves as an example, only. Any further implementation of the invention can be made without any limitation to the invention itself.

What is claimed is:

1. Method for controlling a voltage applied to a piezoelectric element (10, 20, 30, 40, 50, 60) within a circuit (A) for charging and discharging the piezoelectric element (10, 20, 30, 40, 50, 60), comprising:

modifying a target voltage for the voltage applied to the piezoelectric element (10, 20, 30, 40, 50, 60), in view of at least one systematic error occurring during a first control procedure of the voltage applied to the piezoelectric element to obtain a target voltage for a second and/or a further control of the voltage applied to the piezoelectric element; wherein:

a) a system parameter, in particular the voltage across a piezoelectric element (10, 20, 30, 40, 50 or 60), is modified according to a predefined target value, in particular a target voltage ($U_{target}$);

b) the resulting value of the system parameter is measured by measuring means (600, 610; D, E);

c) the measured value is compared to the predefined target value by comparison means (D, E); and d) a target value for a further modification of the system parameter is modified in consideration of detected differences between the measured value and the first predefined target value.

2. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein a1) the system parameter is modified in accordance with at least one control parameter corresponding to a target value;

a2) the modification of the system parameter is performed in a plurality of discrete steps;

a3) the modification procedure is controlled by means of measuring and comparing any obtained value of the system parameter to the target value by measuring means and comparison means, respectively;

a4) the modification procedure is terminated as soon as the obtained value equals the target value by terminating means (E);

b. the obtained value of the system parameter is re-measured after the modification procedure is terminated by measuring means (D, E; 600, 610); and c. the re-measured value of the system parameter is compared as resulting system parameter to the target value by comparison means (D, E).

3. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein detected differences between the measured value and the target value are taken into consideration by means of adding an offset to any desired target value for a further modification procedure.

4. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein an offset is calculated as the absolute or relative difference between the first target value and the corresponding obtained value as measured.

5. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein an offset is a function of an averaged and filtered measured voltage ($<U_{actual}>$) of piezoelectric elements (10, 20, 30, 40, 50, 60) and an averaged and filtered target voltage ($<U_{target}>,<U_{offset,p}>$) for said piezoelectric elements (10, 20, 30, 40, 50, 60).

6. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein the averaged and filtered target voltage ($<U_{target}>,<U_{offset,p}>$) of piezoelectric elements (10, 20, 30, 40, 50, 60) is a function of an averaged and filtered voltage offset value ($<U_{offset,p}>$) and an averaged and filtered initial target voltage ($<U_{target}>$) for the piezoelectric elements (10, 20, 30, 40, 50, 60).

7. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter;

wherein an offset is determined for each of top-closed position, up-open position and down-open position of the piezoelectric elements (10, 20, 30, 40, 50 and 60).

8. Method for controlling system parameters, in particular for controlling the voltage applied to piezoelectric elements (10, 20, 30, 40, 50, 60) within a circuit (A) for charging and discharging piezoelectric elements (10, 20, 30, 40, 50, 60), comprising modifying at least one control parameter for the control of a system parameter, in particular a target voltage for the voltage applied to a piezoelectric element (10, 20, 30, 40, 50, 60), in view of at least one systematic error occurring during a first control procedure of the system parameter to obtain a corrected control parameter for a second and/or a further control of the system parameter, wherein an offset is stored as long as a corresponding position of the piezoelectric elements (10, 20, 30, 40, 50 and 60 is not used.

* * * * *